(12) United States Patent
Casati et al.

(10) Patent No.: US 7,565,304 B2
(45) Date of Patent: Jul. 21, 2009

(54) BUSINESS PROCESSES BASED ON A PREDICTIVE MODEL

(75) Inventors: Fabio Casati, Palo Alto, CA (US);
Ming-Chien Shan, Saratoga, CA (US);
Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

(21) Appl. No.: 10/176,505

(22) Filed: Jun. 21, 2002

(65) Prior Publication Data

US 2003/0236691 A1  Dec. 25, 2003

(51) Int. Cl.
*G06F 17/50* (2006.01)
*G06F 7/00* (2006.01)

(52) U.S. Cl. .................................. 705/7; 705/1; 707/1
(58) Field of Classification Search ................ 705/7
See application file for complete search history.

(56) References Cited

U.S. PATENT DOCUMENTS

| | | | |
|---|---|---|---|
| 5,182,793 A | | 1/1993 | Alexander et al. |
| 5,826,239 A | | 10/1998 | Du et al. |
| 5,870,545 A | | 2/1999 | Davis et al. |
| 5,890,133 A | | 3/1999 | Ernst |
| 5,970,482 A | * | 10/1999 | Pham et al. ............ 706/16 |
| 5,999,911 A | | 12/1999 | Berg et al. |
| 6,006,223 A | | 12/1999 | Agrawal et al. |
| 6,012,051 A | * | 1/2000 | Sammon, Jr. et al. ....... 706/52 |
| 6,014,673 A | | 1/2000 | Davis et al. |
| 6,041,306 A | | 3/2000 | Du et al. |
| 6,212,526 B1 | | 4/2001 | Chaudhuri et al. |
| 6,236,994 B1 | | 5/2001 | Swartz et al. |
| 6,243,105 B1 | | 6/2001 | Hoyer |
| 6,278,977 B1 | | 8/2001 | Agrawal et al. |
| 6,278,994 B1 | | 8/2001 | Fuh et al. |

(Continued)

FOREIGN PATENT DOCUMENTS

WO    WO 01/73666    10/2001

(Continued)

OTHER PUBLICATIONS

Lowe, et al., Implementing the capability maturity model for software development, Aug. 1996, Hewlett-Packard Journal, vol. 47, No. 4.*

(Continued)

*Primary Examiner*—Andre Boyce
*Assistant Examiner*—Justin M Pats

(57) ABSTRACT

Systems and methods of improving business processes are described. These systems and methods enable service providers to improve the quality of services delivered to customers and employees by improving service execution through the optimal selection of resources (e.g., internal resources or external resources, or both) that are invoked to execute the delivered services. In one aspect, process execution data is accessed. Business process instances are classified in accordance with a quality taxonomy. A predictive model including a set of rules for scoring business process outcomes at different stages of the business process is built based upon the classified business process instances. In another aspect, process entities to be invoked at stages of an active business process instance are selected based upon the predictive model. In another aspect, a user is prompted to define a quality taxonomy for classifying outcomes of instances of a business process.

26 Claims, 6 Drawing Sheets

U.S. PATENT DOCUMENTS

| | | | |
|---|---|---|---|
| 6,311,175 | B1 | 10/2001 | Adriaans et al. |
| 6,326,962 | B1 | 12/2001 | Szabo |
| 6,339,838 | B1 | 1/2002 | Weinman, Jr. |
| 6,631,362 | B1 | 10/2003 | Ullman et al. |
| 6,892,238 | B2 | 5/2005 | Lee |
| 6,996,536 | B1 | 2/2006 | Cofino |
| 7,069,179 | B2 | 6/2006 | Kim |
| 7,249,048 | B1 | 7/2007 | O'Flaherty |
| 7,340,650 | B2 | 3/2008 | Westmacott |
| 7,403,985 | B2 * | 7/2008 | Casati et al. ............... 709/223 |
| 2001/0053991 | A1 | 12/2001 | Bonabeau |
| 2001/0054032 | A1 | 12/2001 | Goldman et al. |
| 2002/0062237 | A1 | 5/2002 | Matsumoto |
| 2002/0107824 | A1 | 8/2002 | Ahmed |
| 2002/0174093 | A1 * | 11/2002 | Casati et al. .................. 707/1 |
| 2003/0144868 | A1 | 7/2003 | MacIntyre |
| 2003/0149604 | A1 * | 8/2003 | Casati et al. .................. 705/7 |
| 2003/0225604 | A1 * | 12/2003 | Casati et al. .................. 705/7 |
| 2003/0225644 | A1 * | 12/2003 | Casati et al. ................. 705/35 |
| 2003/0236677 | A1 * | 12/2003 | Casati et al. .................. 705/1 |
| 2003/0236689 | A1 * | 12/2003 | Casati et al. .................. 705/7 |
| 2003/0236691 | A1 | 12/2003 | Casati et al. |
| 2008/0288306 | A1 | 11/2008 | MacIntyre |

FOREIGN PATENT DOCUMENTS

| | | |
|---|---|---|
| WO | WO 01/75747 | 10/2001 |
| WO | WO 02/05154 | 1/2002 |

OTHER PUBLICATIONS

Xie et al., Object Oriented Software Quality Evaluation Technology, Jul. 2000, Technical Report, Software Quality Evaluation Group.*

Wilson, et al., Automated Quality Analysis of Natural Language Requirement Specifications, Oct. 1996, http://satc.gsfc.nasa.gov/support/ PNSQC_OCT96/pnq.PDF.*

Böhnlein, et al., Business Process Oriented Development of Data Warehouse Structures, in Data Warehousing 2000, Nov. 13, 2000, p. 1-16.*

Jarke, et. al., Architecture and Quality in Data Warehouses: An Extended Repository Approach, 1999.*

Chan and Jiang, The Applications of Flexible Manufacturing Technologies in Business Process Reengineering, Int. J. Flexible Manu. Sys., 13 (2) (Apr. 2001): 131-44.*

Ren et al., A new generation of decision support systems for advanced manufacturing enterprises, J. Intell. Manu. (1997) 8, 335-43.*

Jackson, A Structured Approach for Classifying and prioritizing Product Requirements, A dissertation submitted to the Graduate Faculty of North Carolina State University, Industrial Engineering, 1999, p. 72-74.*

Casati and Discenza, Modeling and Managing Interactions among Business Processes, Journal of Systems Integration, vol. 10, 145-68 (Apr. 2001).*

Grigori et al., Improving Business Process Quality through Exception Understanding, Prediction, and Prevention, Proceedings of the 27th VLDB Conference, Roma, Italy, 2001, p. 1-10.*

Vassiliadis et al., Data warehouse process management, Information Systems 26 (2001), p. 205-236.*

Oba and Komoda, Evaluating the Quantitative Effects of Workflow Systems Based on Real Cases, Proceedings of the 33rd Hawaii International Conference on System Sciences, 2000, p. 1-7.*

Klein and Dellarocas, A Knowledge-based Approach to Handling Exceptions in Workflow Systems, Computer Supported Collaborative Work 9, 20003, p. 399-412.*

Muehlen and Rosemann, Workflow-Based Process Monitoring and Controlling-Technical and Organizational Issues, Proceedings of the 33rd Hawaii International Conference on System Sciences, 2000, p. 1-10.*

Terje Jensen et al., "Managing Quality of Service in Multi-Provider Environment," Telecomm'99, pp. 1-8 (1999).

Fabio Casati et al., "Process Automation as the Foundation for E-Business," Proceedings of the 26th International Conference on Very Large Databases, Cairo, Egypt, 2000, pp. 688-691.

Larry Wong, "e-Services: A Key Component for Success," eAI Journal, pp. 18-25, Mar. 2001.

Lisa Cingiser DiPippo et al., "Expressing Quality of Service in Agent Communication," Proceedings of the 2001 International Conference on Aritficial Intelligence, Las Vegas, Nevada, Jun. 2001.

Angela Bonifati et al., "Warehousing Workflow Data: Challenges and Opportunites," Proceedings of the 27th VLDB Conference, Roma, Italy (Sep. 2001).

Daniela Grigori et al., "Improving Business Process Quality through Exception Understanding, Prediction, and Prevention," Proceedings of the 27th VLDB Conference, Roma, Italy (Sep. 2001).

"HP Process Manager White Paper," Hewlett-Packard Company (Oct. 30, 2001).

Umeshwar Dayal et al., "Business Process Coordination: State f the Art, Trends, and Open Issues," Proceedings of the 27th VLDB Conference, Roma, Italy (Sep. 2001).

Jon S. Sjolie, "WebSphere Business Process Integration," IBM Software Group (Nov. 2001).

Miller, et al., Object-oriented data warehouse for information fusion from heterogeneous distributed data and knowledge sources, Information Technology Conf., pp. 27-30, 1998.

Bouzeghoub, et al., Modeling Data Warehouse Refreshment Process as a Workflow Application, Proc. Intl Workshop on Design and Management of Data Warehouse (DMDW'99), Jun. 1999.

Wojciechowski, Mining various patterns in sequential data in a SQl-like manner, ADBIS'99, Marlor, Slovenia, 1999.

Reddy et al., Data Warehouse Architecture for Army Installations, US Army Corps of Engineers, Engineer Research and Development Center, Nov. 1999.

Ansari et al., S., "Integrating E-Commerce and Data Mining: Architecture and Challenges", 2001 IEEE International Conference on Data Mining Available, Nov. 29, 2001-Dec. 2, 2001( 8 pages).

Buchner, A. G. and Mulvenna, M. D. 1998. Discovering Internet marketing intelligence through online analytical web usag mining. SIGMOD Rec. 27, 4 (Dec. 1998),54-61.

Ansari, S., 2000. Integrating E-Commerce and Data Mining: Architecture and Challenges, Web-KDD, Aug., 2000.

M. zur Muhlen, M. Rosemann, Workflow-based process monitoring and controlling—technical and organizational issues, in: R. Sprague (Ed.), Proceedings of the 33rd Hawaii International Conference on System Science (HICSS-33), IEEE Computer Society Press, Los Alamitos, California, 2000, pp. 1-10.

* cited by examiner

BUSINESS PROCESSES BASED ON A PREDICTIVE MODEL

CROSS-REFERENCE TO RELATED APPLICATIONS

This application relates to the following co-pending applications, each of which is incorporated herein by reference: U.S. patent application Ser. No. 09/860,230, filed May 17, 2001; U.S. patent application Ser. No. 10/177,273, filed Jun. 21, 2002; and U.S. patent application Ser. No. 10/177,423, filed Jun. 21, 2002.

TECHNICAL FIELD

This invention relates to systems and methods of improving business processes.

BACKGROUND

Competitive pressures are forcing organizations to integrate and automate their business operations, such as order processing, procurement, claims processing, and administrative procedures. As a result, process design, automation, and management technologies are being used in both traditional and newly-formed, Internet-based enterprises in order to improve the quality and efficiency of their administrative and production processes, to manage electronic commerce (or e-commerce) transactions, and to rapidly and reliably deliver services to businesses and individual customers.

Electronic business (or e-business) is implemented by business processes that enable information to be accessed, updated and communicated in a purely digital format. E-business is transforming corporations, markets, and the global economy. The conduct of business over Internet (e.g., buying, selling, servicing customers and collaborating with business partners) is affecting how business transactions are performed. For example, web services allow customers to easily find products, services, providers and suppliers that they need, compare prices and qualities, and trade, buy, and get products and services delivered quickly. Customers may be presented with user-friendly graphical interfaces, targeted advertisements, up-to-date product catalogues, and personalized stores. The web facade, however, hides inefficiencies, manual and error-prone operations, and slow, complex, inflexible, and unmanageable systems. Indeed, in many e-business applications, the execution of business processes involves a substantial amount of human intervention in several aspects of business process execution, such as (repeated) data entry, process execution monitoring (a process that often requires tracking each process over several systems in order to find out its current advancement state), exception handling, and scheduling of process activities.

Inefficiencies in e-business processes impose high operating costs that are strongly affecting the profits of many e-business entities. To compete successfully, enterprises are demanding effective ways to implement e-business and deliver e-services over the Internet. In order to attract and retain customers as well as business partners, organizations also need to provide their services (i.e., execute their processes) with a high, consistent, and predictable quality. In general, in order to deliver such quality, business processes should be designed correctly, their execution should be supported by a system that can meet workload requirements, and the (human or automated) process resources should be able to perform their work items in a timely fashion.

SUMMARY

The invention features systems and methods of improving business processes. The invention enables service providers to improve the quality of services delivered to customers and employees by improving service execution through the optimal selection of resources (e.g., internal resources or external resources, or both) that are invoked to execute the delivered services.

In one aspect of the invention, process execution data is accessed. The process execution data is generated by one or more components of a business process platform during execution of one or more instances of a business process involving a set of one or more activities each defined by a respective service and performed by a respective set of one or more resources. Business process instances are classified in accordance with a quality taxonomy. A predictive model comprising a set of rules for scoring business process outcomes at different stages of the business process is built based upon the classified business process instances.

Embodiments in accordance with this aspect of the invention may include one or more of the following features.

The quality taxonomy preferably comprises a set of quality categories each associated with a respective condition on the process execution data and a corresponding quantitative quality score value. The step of classifying business process instances preferably comprises applying the quality taxonomy to process execution data to characterize business process instances with respective quality score values.

In some embodiments, the step of building the predictive model comprises partitioning the business process into a set of logical stages. Each logical stage may comprise a set of one or more nodes in a definition of the business process. The step of building the predictive model preferably comprises, at a given logical stage, generating rules for predicting outcomes of the business process based upon context data and a set of one or more business process entities invocable at the given logical stage. The predictive rules may specify outcome probabilities for each category in the quality taxonomy. The invocable business process entities may be selected from services or resources, or both.

In some embodiments, process entities to be invoked at stages of an active business process instance are selected based upon the predictive model. Process entities may be selected for invocation in accordance with one or more specified quality goals. A quality goal may correspond to one of: maximizing average quality per business process instance; and maintaining business process instance quality above a threshold value. The step of selecting process entities preferably comprises applying the predictive model to context data (e.g., available process execution data) at a current stage of an active business process instance to obtain predictions of business process outcomes for each business process entity invocable at the current business process stage. The invocable business process entities may be selected from services or resources, or both.

In another aspect, the invention features a computer program residing on a computer-readable medium and operable to implement the above-described business process improvement method.

In another aspect of the invention, process entities to be invoked at stages of an active business process instance are selected based upon a predictive model comprising a set of rules for scoring business process outcomes at different stages of the business process.

In another aspect the invention features a computer program residing on a computer-readable medium and comprising computer-readable instructions for causing a computer to select process entities to be invoked at stages of an active business process instance based upon a predictive model comprising a set of rules for scoring business process outcomes at different stages of the business process.

In another aspect of the invention, a user is prompted to define a quality taxonomy for classifying outcomes of instances of a business process involving a set of one or more activities each defined by a respective service and performed by a respective set of one or more resources.

Embodiments in accordance with this aspect of the invention may include one or more of the following features.

The quality taxonomy preferably comprises a set of quality categories (e.g., "good", "mediocre", and "bad") each associated with a respective condition on the process execution data and a corresponding quantitative quality score value. In some embodiments, a user may be prompted to define one or more quality goals in accordance with which business process entities are to be selected for invocation at stages of an active business process instance. A quality goal may correspond to one of: maximizing average quality per business process instance; and maintaining business process instance quality above a threshold value.

In another aspect, the invention features a system comprising a graphical user interface configured to prompt a user to define a quality taxonomy for classifying outcomes of instances of a business process involving a set of one or more activities each defined by a respective service and performed by a respective set of one or more resources.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
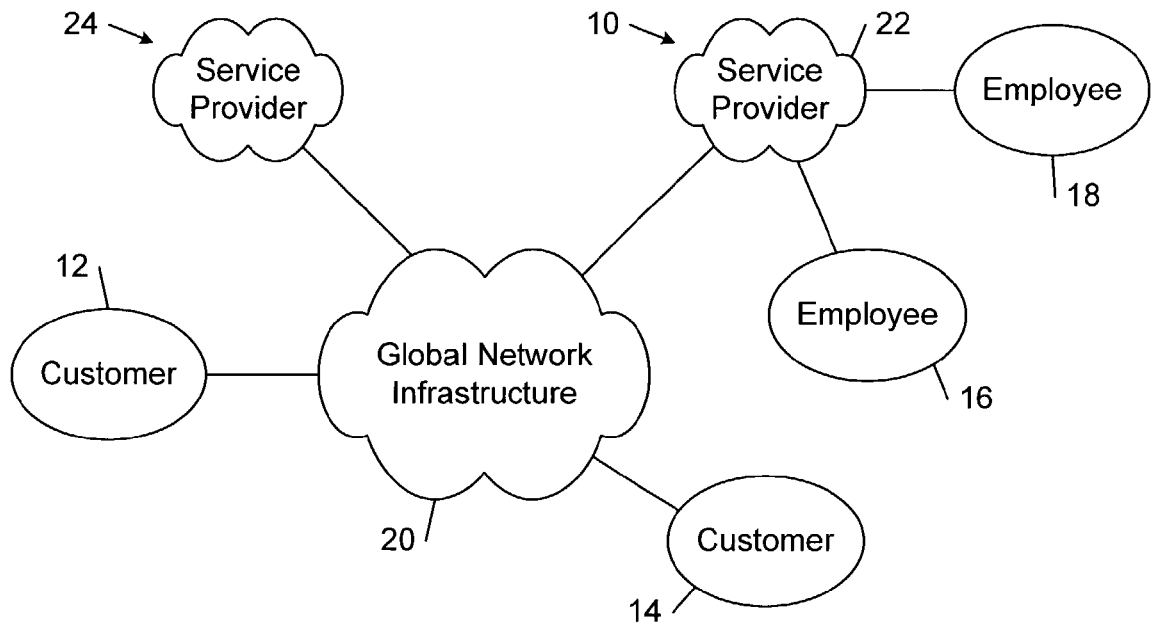
FIG. 1 is diagrammatic view of an e-business driven infrastructure that includes service providers, customers and employees that are interconnected by a global communication network.

Referring to FIG. 1, in one embodiment, a service provider 10 may deliver one or more services to customers 12, 14 and employees 16, 18 over a global communication network 20 and a service provider network 22. In order to deliver such services, service provider 10 executes processes and functions that may require the use of several resources and the invocation of other services, possibly offered by one or more remote service providers 24. For example, to deliver an e-procurement service, service provider 10 may invoke (web or traditional) services provided by suppliers, warehouses, and shipment companies, as well as services provided by internal (human or automated) resources, such as administrative employees, ERP (Enterprise Resource Planning) systems, Java beans, implementation of WSDL (Web Service Description Language) services, and printers.

Global communication network 20 may include a number of different computing platforms and transport facilities, including a voice network, a wireless network, and a computer network. Service requests may be transmitted, and service replies may be presented in a number of different media formats, such as voice, Internet, e-mail and wireless formats. In this way, customers 12, 14 may access the services provided by service provider 10 using any one of a wide variety of different communication devices. For example, in one illustrative implementation, a wireless device (e.g., a wireless personal digital assistant (PDA)) may connect to service provider 10 over a wireless network. Communications from the wireless device may be in accordance with the Wireless Application Protocol (WAP). A wireless gateway converts the WAP communications into HTTP messages that may be processed by service provider 10. In another illustrative implementation, a voice device (e.g., a conventional telephone) may connect to service provider 10 over a voice network. Communications from the voice device may be in the form of conventional analog or digital audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive from service provider 10 real time audio messages that may be passed directly to the voice device. Alternatively, service provider 10 may transmit formatted messages (e.g., VoxML, XML, WML, e-mail) that must be converted to a real time audio format (e.g., using text-to-speech technology) before the messages may be passed to the voice device. In a third illustrative implementation, a software program operating at a client personal computer (PC) may access the services of service provider 10 over the Internet.

Figure 2:
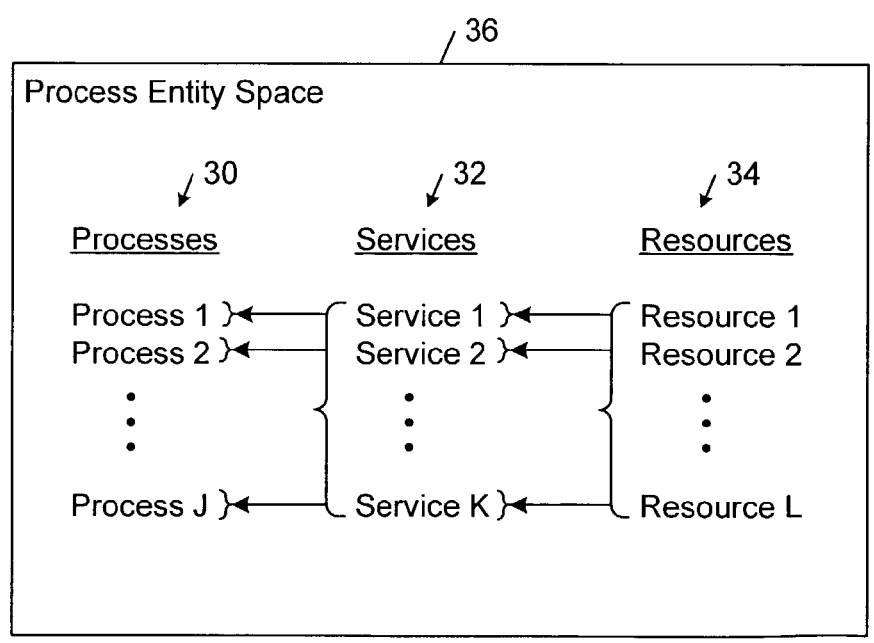
FIG. 2 is a diagrammatic view of a process entity space.

Referring to FIG. 2, the services provided by service provider 10 may be built from a collection of business process entities, including processes 30, services 32, and resources 34. In particular, any given service may be specified and implemented as a business process 30, whose executions may in turn invoke other services 32. Each service 32 is executed by one or more resources 34, each of which performs an activity in accordance with the service specification. Each resource 34 may be perform one more services 32, and each service 32 may be invoked by one or more processes 30. In the context of process entity space 36, each business process 30 may be visualized along multiple dimensions and multiple levels of granularity based upon the mappings between the business process and its associated services and resources.

Figure 3:
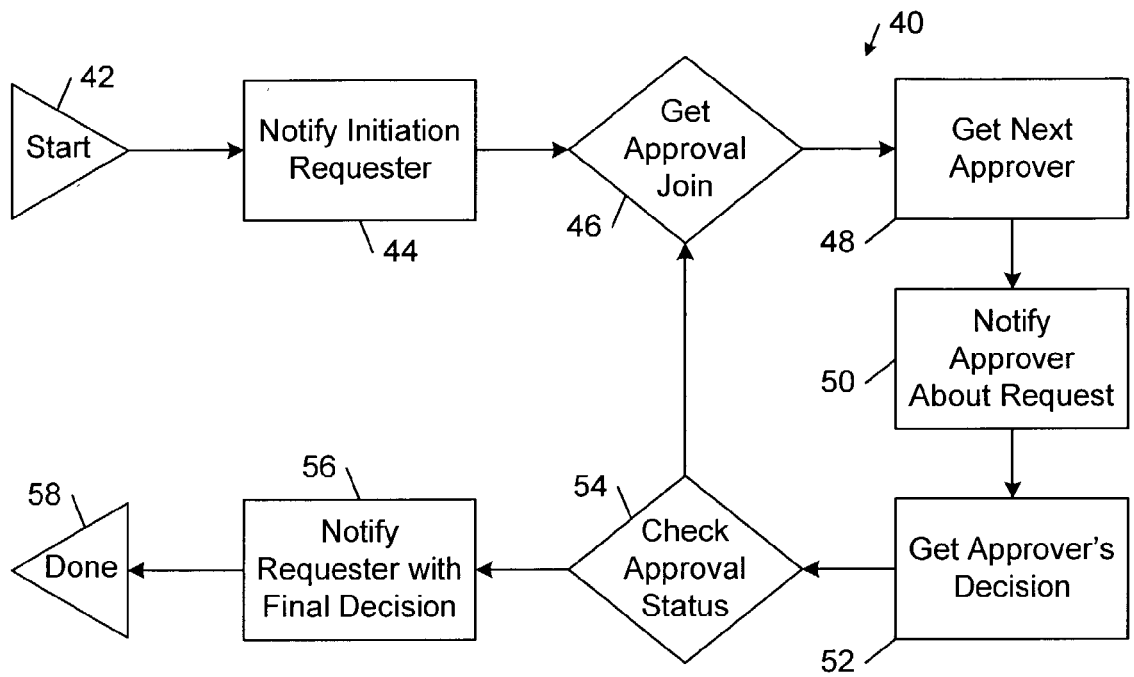
FIG. 3 is a workflow diagram of an expense approval process.

As shown in FIG. 3, a business process may be modeled as a directed graph 40 having different types of nodes including, for example, work nodes, route nodes, start nodes, and completion nodes. A work node represents the invocation of a service (or activity). Each work node is associated with a service description that defines the logic for selecting a resource or resource group to be invoked for executing the work (i.e., delivering the service). The service definition also identifies the case packet data items (i.e., the variables of the process instance) to be passed to the resource upon invocation (e.g., execution parameters or input data) and to be received from the resource upon completion of the work (e.g., status values, output data). Several work nodes may be associated to the same service description. Route nodes are decision points that control the execution flow among nodes based on a routing rule. A start node denotes the entry point to the process, and completion nodes denote termination points. A process definition may be instantiated several times and multiple instances may be concurrently active. Node executions may access and modify data included in a case packet.

As used herein, the term "service" refers broadly to any entity invoked during the execution of a process or function, including human entities, automated entities, internal entities and external entities, independent of the technology that is used to deliver the service. A service may be composed of a single atomic activity to be executed by a human or automated resource. Alternatively, a directed graph that is composed of a combination of work nodes and decisions may be referred to as a service. The term "service" permits a convenient reference by name to a specific graph of activities and decisions without re-iterating these individual components. In this way, the series of activities may be invoked by referring to the service instead of the component sequence of tasks. The introduction of services enables a single definition to be re-used multiple times within the same process or in multiple processes. Thus a service may be used multiple times by a given process or by more than one process.

In the embodiment illustrated in FIG. 3, graph 40 models an expense approval process. The process begins in start node 42 with the requester. The case packet data for the expense approval process may include, for example, the identity of the requester, the expense amount, the reasons, and the names of the individuals that should evaluate the request. Once the process is initiated, the requester is notified in work node 44. Work node 44 may invoke another service for notification. For example, notification may be performed by the service send_email, which is executed by resource email_server. Upon invocation of the send_email service, an email is sent to the requester with notification that the process has begun. The process loops among the list of individuals until either all of the approvers approve the expense request or one of the approvers rejects the expense request (nodes 46-58). (Join 46 is an OR join that fires whenever any input fires.) The final decision is reported to the requester in work node 56 before the process terminates at completion node 58.

At run time, when a work node is executed, a work item is dispatched to internal or external resources (e.g., an employee, a computer system within the domain of service provider 10, or an application operated by another business entity), which are invoked to perform a service. The appropriate resources may be selected by a resource broker based upon business logic that may be included as part of the process definition, work node definition, or system configuration; alternatively, resources may be determined by contacting a resource broker. A work item (i.e., the description of a service to be executed) typically is identified by a name (e.g., approve_request) and by a set of data items (e.g., the name of the requester, the purpose of the request, and the amount of money required to fulfill the request). The work may be dispatched in several different ways. For example, the work item may be inserted into a resource work list, in which case resources log into the system to retrieve work items. In other approaches, a process automation system sends work items to the selected resources, in which case resources are presented with a set of work items to be performed when the resources access their work lists. A resource may select one or more items from the work list, execute the selected items, and return the result to the process automation system.

Figure 4:
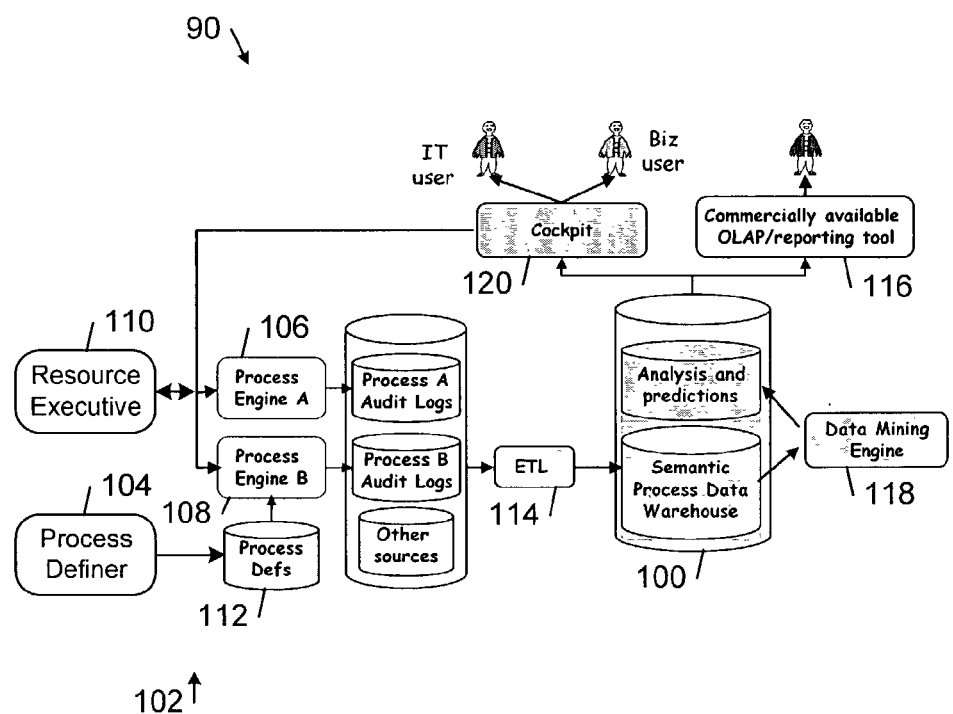
FIG. 4 is a block diagram of internal components of a business operational intelligence engine and a business process data warehouse.

Referring to FIG. 4, in one embodiment, business operational intelligence engine 90 includes a business process automation tool 102 (e.g., an HP Process Manager, available from Hewlett-Packard Company of Palo Alto, Calif., U.S.A.) comprising a process definer 104, one or more process engines 106, 108, and a resource executive 110. Process definer 104 defines processes as a collection of nodes, services, and input and output parameters. The process definitions are stored in a database 112. Database 112 may contain, for example, a process definition that includes a start node, a completion node, work nodes, route nodes, and services to be invoked by the process. A process definition also includes an indication of the way in which the nodes are interconnected. Process engines 106, 108 execute processes by scheduling nodes to be activated. When a work node is activated, process engines 106, 108 retrieve the associated service definition and resource assignment rule. The resource assignment rule is communicated to the resource executive 110 (also called resource broker), which identifies one or more resources (e.g., a specific vendor, employee, or piece of equipment) that should execute the service. During execution of processes, process engines 106, 108 step through the process definitions to determine which activities should be performed next, and use the resource executive 110 to assign a resource (or resources) to the activities. Process engines 106, 108 send activity requests and any data needed to perform the activities to the resources identified by the resource executive 110. When the activity is completed, the process engines 106, 108 refer to the process definitions to determine the next nodes to be activated.

An extract, transfer, and load (ETL) application 114 collects data from the audit logs and loads the data into business process data warehouse 100. ETL application 114 performs conventional warehousing functions, such as data cleaning, and formats the process execution data into a predefined record format. Additional details relating to the structure and operation of the business process data warehouse 100 and ETL application 114 may be obtained from U.S. patent application Ser. No. 09/860,230, filed May 17, 2001, by Fabio Casati et al. and entitled "Method of Identifying and Analyzing Business Processes from Workflow Audit Files," and Angela Bonifati et al., "Warehousing Workflow Data: Challenges and Opportunities," Proceedings of VLDB'01, Rome, Italy (September 2001), each of which is incorporated herein by reference. Data in the business process data warehouse 100 may be accessed directly with a commercial reporting tool 116 (e.g., Crystal Reports, available from Crystal Decisions, Inc. of Palo Alto, Calif., U.S.A., and Oracle Discoverer available from Oracle Corporation of Redwood Shores, Calif.). In addition, a data mining tool 118 may apply data mining techniques on top of business process data warehouse 100 to assist analysts in identifying the causes of high and low-quality executions and deriving prediction models that may be used at run-time to predict process execution quality for running processes.

Business operational intelligence engine 90 also includes a business process cockpit (BPC) 120 that enables a user to investigate a business process by supporting real-time monitoring, analysis, management, and optimization of business processes running on top of the business process automation tool 102. Business process cockpit 120 provides a graphical user interface through which users may apply data warehousing and data mining techniques to business process execution data. As explained in detail below, business process cockpit 120 allows business and IT users to analyze data contained in business process data warehouse 100 according to multiple perspectives. The business process cockpit 120 is designed to make it easy for (non-technical) users to define a wide range of queries and, more generally, of analysis and quality criteria, without writing any code. The information is presented in an intuitive and direct format, so that users may easily and immediately get the information they need. In addition, business process cockpit 120 is configurable according to the needs and preferences of different users. Business process cockpit 120 also monitors processes, services, resources, and other process-related entities, and inform users of actual or foreseen quality degradation. Business process cockpit 120 also may send notifications to users on the medium of their choice. Business process cockpit 120 is operable to manage running processes by tuning process and system configuration parameters (such as the process priority) and by notifying events to processes.

As explained in detail below, business operational intelligence engine 90 enables service provider 10 to improve the quality of services delivered to customers 12, 14 and employees 16, 18 by improving service execution through the optimal selection of (internal or external, or both) resources that are invoked to execute the delivered services. This approach may be applied to the selection of services for implementing a business-to-business or business-to-customer web service, and to the selection of resources in an automated process environment, both in the traditional enterprise (e.g., to automate enterprise processes or integrate enterprise applications) and in the service-centric paradigm (e.g., service composition).

Figure 5:
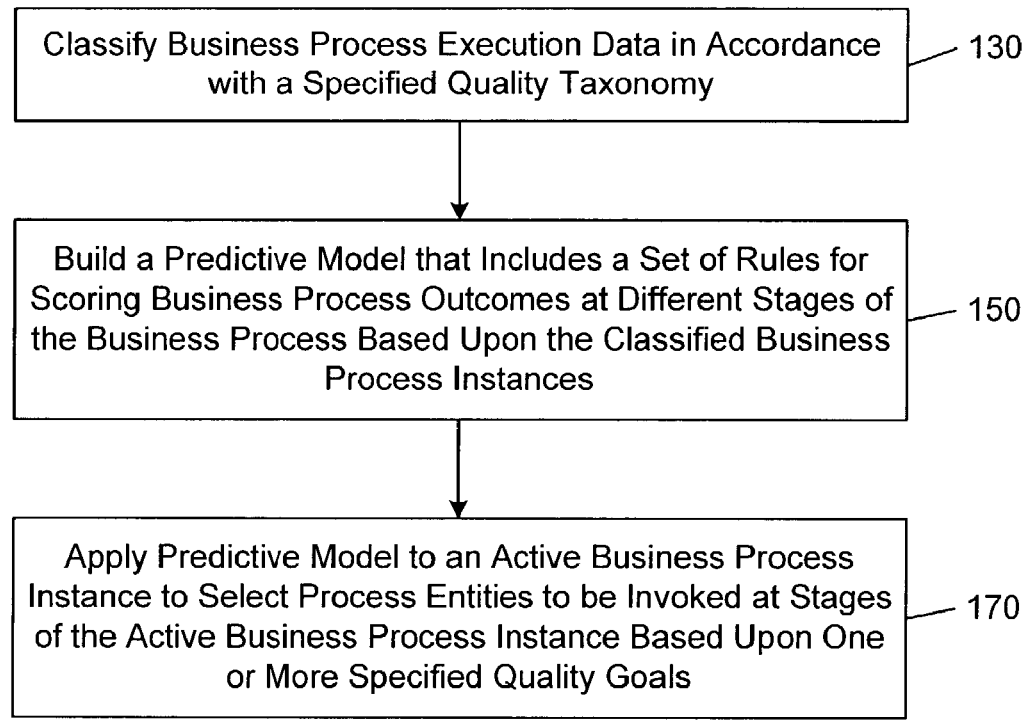
FIG. 5 is a flow diagram of a method of improving a business process.
Figure 6:
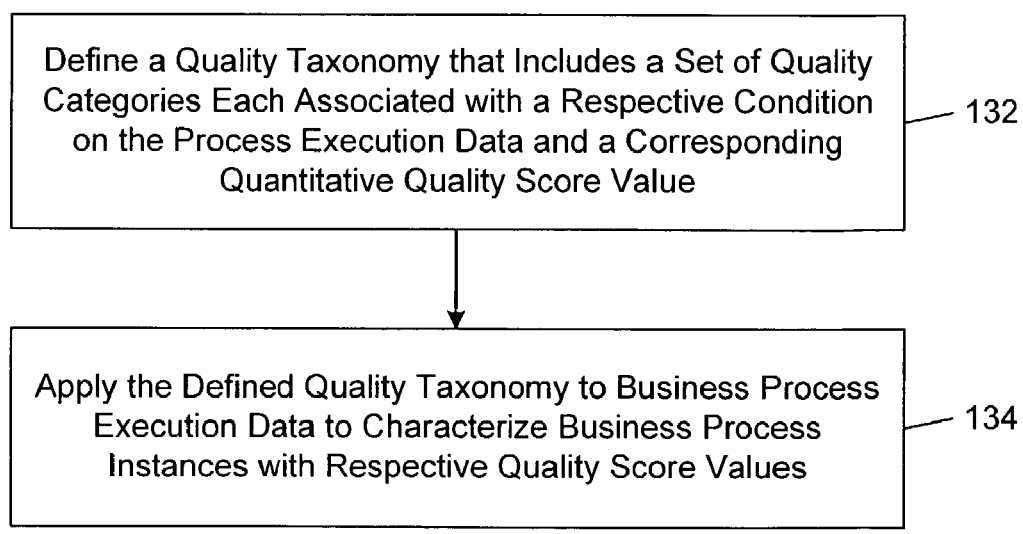
FIG. 6 is a flow diagram of a method of classifying business process execution data in accordance with a specified quality taxonomy.

Referring to FIGS. 5, 6, 7A, 7B, 8A and 8B, and initially to FIGS. 5 and 6, in one embodiment, a user may operate business operational intelligence engine 90 to improve a business process as follows.

Initially, business process execution data is classified in accordance with a specified quality taxonomy (step 130; FIG. 5). In particular, a quality taxonomy is defined to include a set of quality categories each of which is associated with a respective condition on the process execution data and a corresponding quantitative quality score value (step 132; FIG. 6). The defined quality taxonomy is applied to the business process execution data to characterize historical business process instances with respective quality score values (step 134; FIG. 6).

Figure 7A:
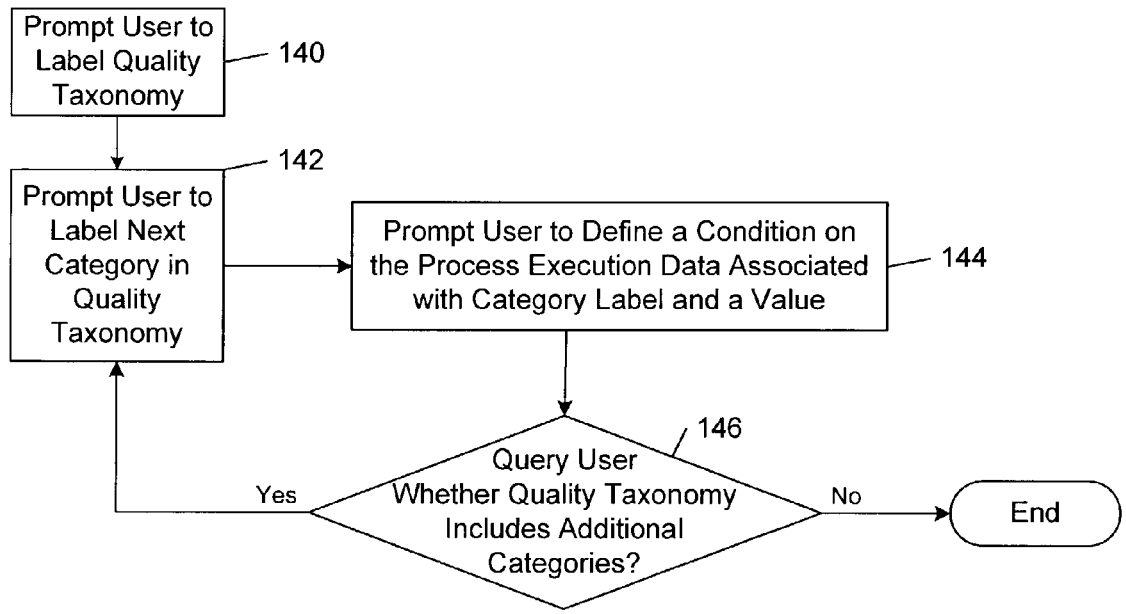
FIG. 7A is a flow diagram of a method of prompting a user to define a quality taxonomy for classifying outcomes of a business process.
Figure 7B:
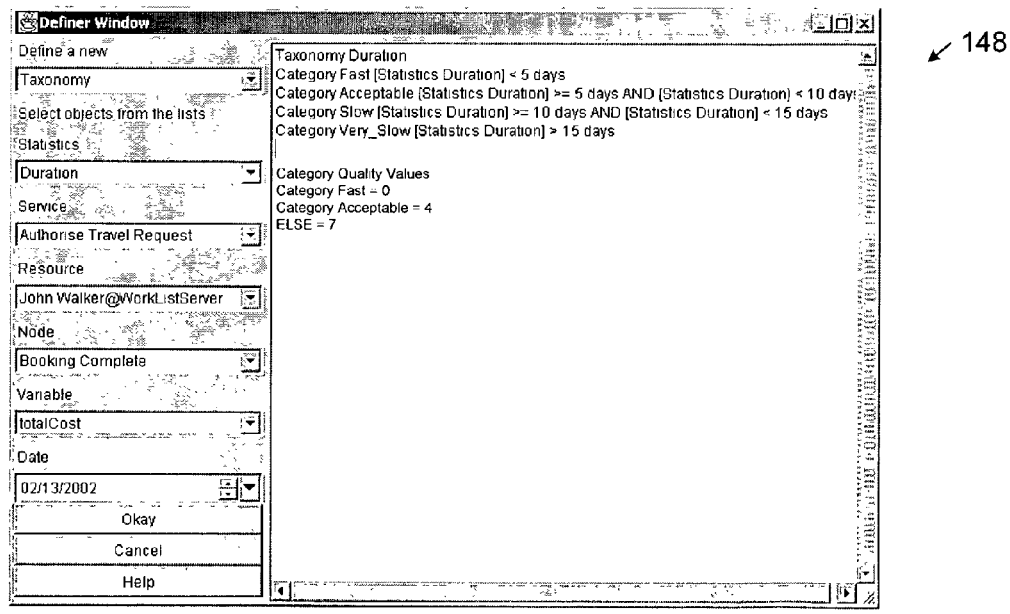
FIG. 7B is a graphical user interface prompting a user to define a quality taxonomy for classifying outcomes of a business process.

Referring to FIGS. 7A and 7B, in some embodiments, a user may define a quality taxonomy as follows. In general, a taxonomy is a user-defined way to classify instances of a process depending on its characteristics. Many taxonomies may be defined for the same process, and each taxonomy may have several categories. By construction, for each taxonomy, a process instance should fall within one and only one category at any given time. In some embodiments, however, if an instance belongs to more than one category, it is inserted in a special category "error," which is defined implicitly for each taxonomy. In addition, if it cannot be determined in which category a particular instance belongs, it is inserted in another special category "undefined", which also is defined implicitly for each taxonomy.

Initially, a user is prompted to label the quality taxonomy to be defined (step 140). Next, the user is prompted to select a label for a category in the quality taxonomy (step 142). The user is prompted to define a condition on the process execution data that is associated with the category and a corresponding quantitative score value (step 144). The condition defines a partition over process instances and is specified by identifying a process execution variable of a set of process instance execution data records stored in data warehouse 100 for one or more processes and by specifying a Boolean condition on the process instance execution data. In general, the condition may be based on any data item included in the process execution log files. Each condition should be verifiable by looking at the logs so that is it possible to associate a quality level to any process instance. Conditions may be defined as SQL or XML queries, depending on whether data warehouse 100 is a relational or an XML database. Examples of Boolean conditions that may be of interest are: number of activations of a node; assignment of a node (or of any node) to a given resource; duration of nodes; duration of an entire process; value of data items at process instantiation time, completion time, or after execution of a node. The quantitative quality score value associated with each condition expresses the relative values of the conditions as perceived by the service provider. For example, a service provider may specify that a process instance ending with a "success" message has a certain (e.g., high) quality, whereas a conversation ending with a "reject" message has another (e.g., lower) quality. The user is prompted to repeat the process until all of the categories in the taxonomy have been specified (step 146).

As shown in FIG. 7B, in some embodiments, a quality taxonomy may be defined by instantiating a template 148. The template 148 identifies a generic process behavior, such as: Processes P in which a resource R has been involved in the execution. A template may be then instantiated by specifying the parametric parts (P and R in this example). For example in the illustrated embodiment, a duration-based quality taxonomy is defined by specifying conditions on a set of four categories: fast (defined as processes lasting less than 5 days), acceptable (between 5 and 10 days), slow (between 10 and 15 days), and very slow (more than 15 days). The template also prompts the user to enter quantitative quality score values for each category. In the illustrated embodiment, the user has assigned the fast category a quality score value of 0, the acceptable category a quality score value of 4, and the two remaining categories respective quality score values of 7. In general, complex categories may be defined by conjunction or disjunction of simple categories. Business process cockpit 120 may provide several templates that may be instantiated by filling out a form that is translated by business process cockpit 120 into a set of SQL (or XML) statements. Template libraries may be updated by downloading templates from a web site. Templates may be implemented by means of SQL (or XML) statements that analyze data in the business process data warehouse 100 and determine the categories to which a process instance belongs. For example, an outcome-based taxonomy may include the categories "success" and "failure," while a performance-based taxonomy may include the categories fast, acceptable, slow.

Referring back to FIGS. 5, 8A and 8B, after business process execution data has been classified in accordance with the specified quality taxonomy (step 130; FIG. 5), a predictive model is built (step 150; FIG. 5). The predictive model includes a set of rules for predicting the category to which each running process instance is likely to belong once it is completed. Different sets of rules may be used for each process execution stage. Ranking refers to the problem of defining a relative ordering among services depending on the context and on the specified quality goals. Rating, on the other hand, implies an indication of the quality level that can be expected when invoking a given service (or resource) in a given context. In the illustrated embodiment, rating is used to determine rankings; other embodiments, however, may use different strategies to determine rankings.

Figure 8A:
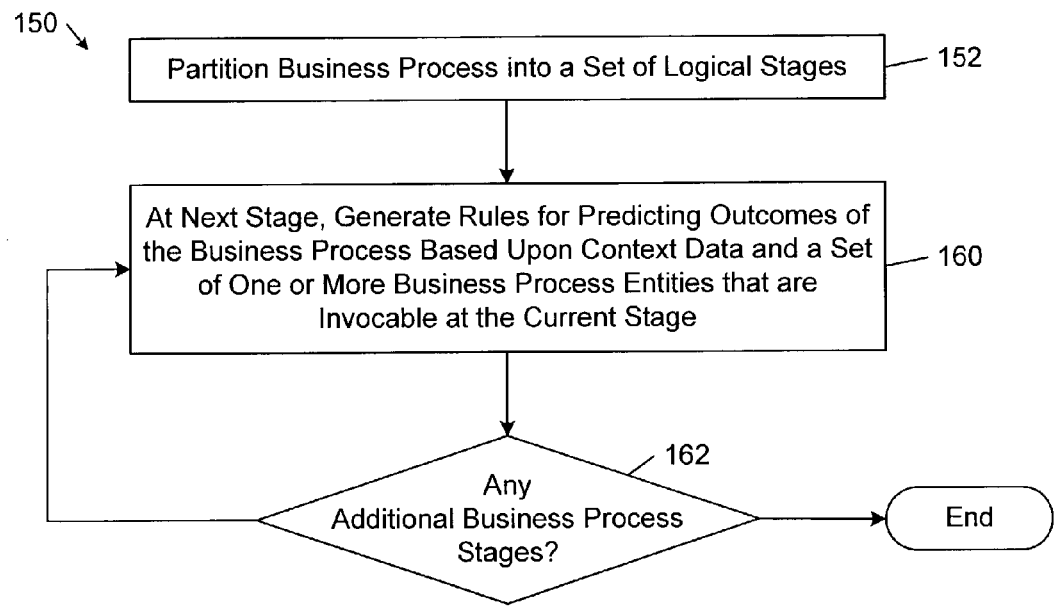
FIG. 8A is a flow diagram of a method of building a predictive model that includes a set of rules for scoring business process outcomes at different stages of the business process.

Initially, the predictive model is built by partitioning the business process into a set of logical stages (step 152; FIG. 8A). Each logical stage may encompass one or more nodes in the business process definition. In one embodiment, conventional data mining techniques are used to partition the contexts. For example, it may include all the nodes in the path from the start node to a specific node. The problem of identifying the appropriate partition is similar to that of defining the appropriate depth of a decision tree. In general, finer partitions allow the identification of more specific context and, therefore, of more accurate ratings for that specific context sub-space. Rankings for narrow partitions for which there is only limited data available, however, may be sensitive to noise, which may produce erroneous results Generic rankings and ratings (i.e., rankings and ratings obtained based on an un-partitioned context space) also are identified using conventional data mining techniques.

Figure 8B:
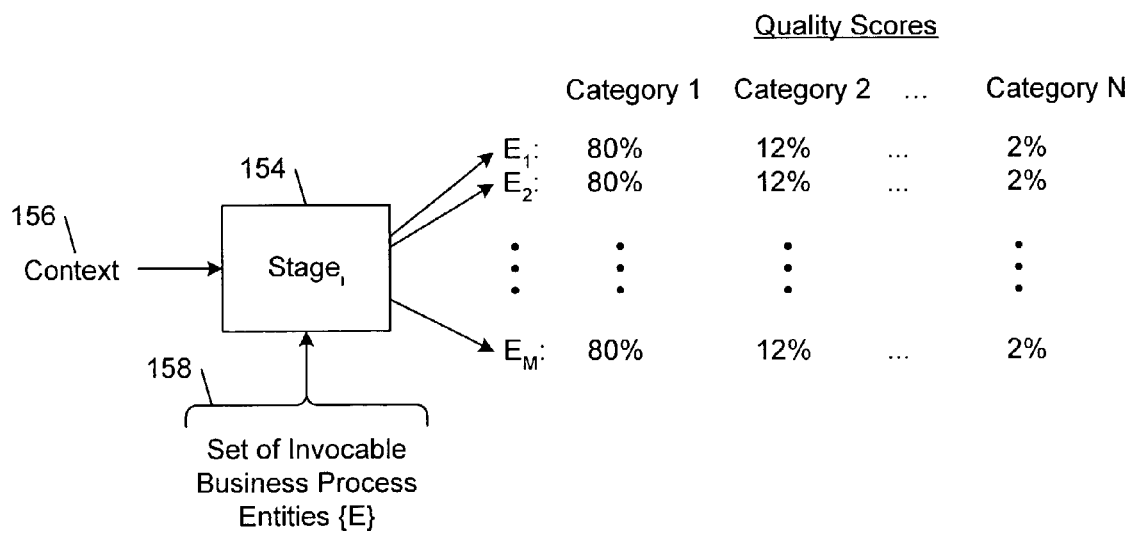
FIG. 8B is a diagrammatic view of a set of rules assigning scores to business process outcomes for a current stage in the business process based upon context data and a set of one or more business process entities that are invocable at the current stage.

Referring to FIGS. 8A and 8B, after the business process has been partitioned into a set of logical stages (step 152; FIG. 8A), rules are generated at the current logical stage 154 for predicting outcomes of the business process based upon context data 156 and a set 158 of one or more business process entities {E} that are invocable at the current logical stage 154 (step 160; FIG. 8A). In general, the invocable business process entities may be selected from services or resources, or both. This process is repeated for each stage of the business process (step 162; FIG. 8A). As shown in FIG. 8B, the prediction rules may be expressed in terms of a set of business process outcome probabilities for each quality category (Category 1, Category 2, . . . , Category N) for each business process entity ($E_1, E_2, \ldots, E_M$) that is invocable at a given stage ($Stage_1$) of the business process. Since each category is associated to a value, it is possible to predict the final value of the process instance depending on which entity is selected, thereby ranking the entities.

Referring back to FIG. 5, in some embodiments, after the predictive model has been built (step 150; FIG. 5), the predictive model is applied to an active business process instance to select process entities to be invoked at stages of the active business process instance based upon one or more specified quality goals (step 170; FIG. 5). In these embodiments, the objective is to determine which service (or resource) performs best within a given context (e.g., a process instance started in a certain day of the week by a customer with certain characteristics) and towards achieving a specific quality goal, defined, for example, in terms of scores associated to quality categories. The specified quality of service goal should be specified in a way that provides business operational intelligence engine 90 a well-defined optimization problem to solve. In general, the quality of service goals are specified in a probabilistic domain. Thus, each choice that attempts to improve quality will lead to a probability function such that process instances may have different quality levels with different probabilities. The quality of service goals may be specified in a wide variety of different ways, including maximizing the average quality per conversation, and ensuring that the quality is above a specified threshold with a specified probability. As explained in detail below, after the optimization criterion has been defined, business operational intelligence engine 90 may dynamically optimize service executions to achieve the specified quality goal.

Figure 9A:
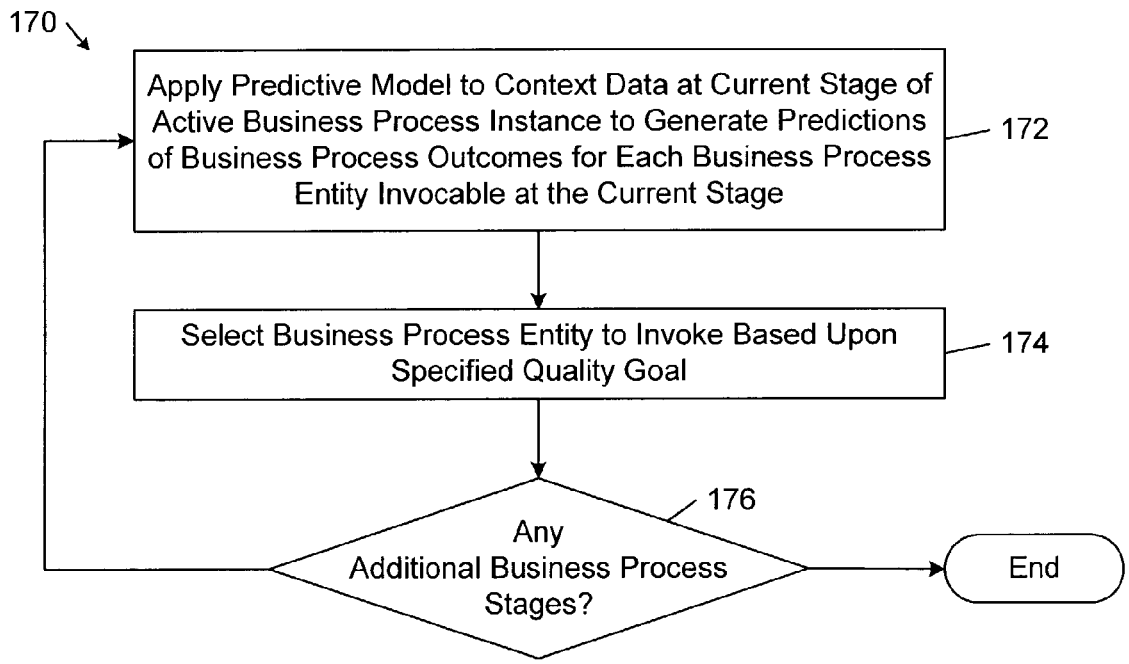
FIG. 9A is a flow diagram of a method of applying a predictive model to an active business process instance to select business process entities to be invoked at stages of the active business process.
Figure 9B:
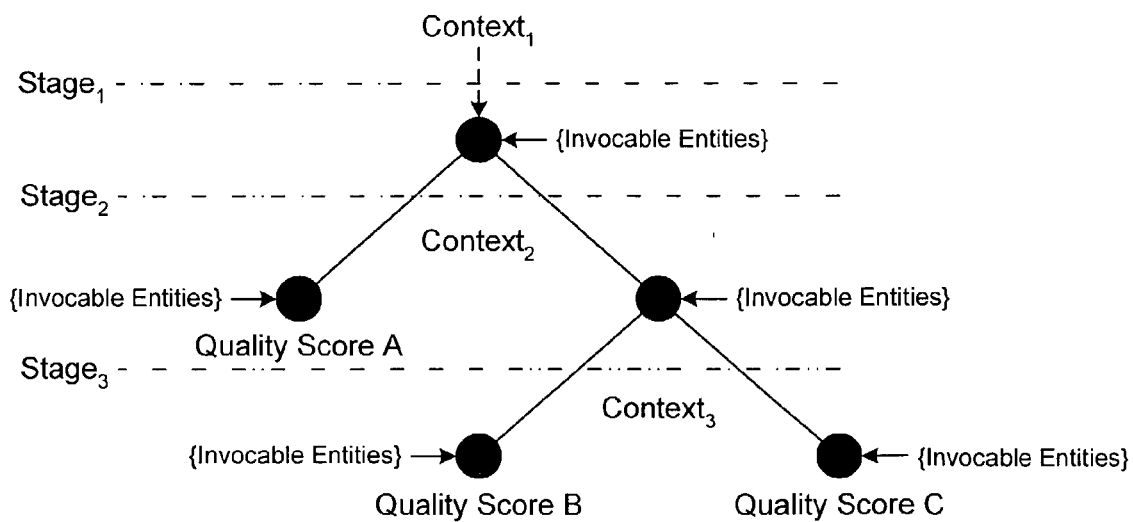
FIG. 9B is a diagrammatic view of a decision tree illustrating schematically a process of selecting business process entities based upon application of a predictive model.

As shown in FIGS. 9A and 9B, the prediction model is applied to context data at a current stage of an active business process instance to generate predictions of business process outcomes for each business process entity that is invocable at the current stage (step 172; FIG. 9A). The predictions may be expressed as a set of quality scores (Quality Score A, Quality Score B, Quality Score C), each associating a set of outcome probabilities for each category in the quality taxonomy to each of the business process entities invocable at the current stage of the active business process, and therefore a set of probabilities for the values associated to the category. A business process entity to be invoked at the current stage of the active business process then is selected based upon the specified quality goal (step 174; FIG. 9A). In particular, the context at the current stage is evaluated to determine the partition of the context space. If the context is not part of any known partition (e.g., a service is needed in the context of a new process type), then the generic ratings are used. Otherwise, the set of ratings corresponding to the partition of interest is identified. Then, a service is selected based upon the rating and the identified goal. If the goal is that of maximizing the expected quality, for example, then the service associated with the highest expected business process outcome quality is selected. In another example, if the specified quality of service goal is in terms of a specified guaranteed quality, then the service (or resource) that has the highest probability of meeting the specified quality level is selected. Other selection policies are possible depending upon the specified quality of service goal. The process is repeated for each stage in the business process (step 176; FIG. 9A).

The systems and methods described herein are not limited to any particular hardware or software configuration, but rather they may be implemented in any computing or processing environment, including in digital electronic circuitry or in computer hardware, firmware or software. In general, the components of the business operational intelligence engine may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Additional details relating to the structure and operation of business operational intelligence engine 90 and business process cockpit 120 may be obtained from U.S. patent application Ser. No. 10/177,423, filed Jun. 21, 2002.

Other embodiments are within the scope of the claims.

For example, the above-described business process improvement approach may be implemented as part of a service selection platform that generates a predictive model from historical process execution data received from a customer. The customer may transmit context data for a current stage of an active business process instance and the service selection platform may return a set of rankings of services that are invocable at the current business process stage. The customer may then select a service for invocation based upon the set of rankings received from the service selection platform.

Still other embodiments are within the scope of the claims.

What is claimed is:

1. A method, comprising operating a computer processor to perform operations comprising:

accessing process execution data derived from audit logs generated during execution of instances of an automated business process comprising business process entities and defined by a directed graph of interconnected nodes representing respective activities, wherein the business process entities comprise services and resources, and each of the activities is defined by a respective service and is performed by a respective set of one or more resources;

classifying the instances of the business process in accordance with a quality taxonomy defined by a set of quality categories each of which is associated with a respective condition on the process execution data and a respective quality score value, wherein the classifying comprises assigning the business process instances to respective ones of the quality categories based on application of the respective conditions to the accessed process execution data;

building a predictive model comprising a respective set of predictive rules for each of multiple logical partitions of the directed graph defining the business process based upon the assignment of the business process instances to respective ones of the categories, wherein each of the predictive rules assigns a respective probability to each of the quality categories of the quality taxonomy for each of the business process entities that are invocable at the respective logical partitions of the directed graph, and each of the probabilities represents a likelihood that a given business process instance that invokes the respective business process entity at the respective logical partition of the directed graph will have an outcome corresponding to the respective quality category; and executing an active instance of the business process based on the predictive model.

2. The method of claim 1, wherein the building comprises partitioning the directed graph into the logical partitions.

3. The method of claim 2, wherein the building comprises, at each of the logical partitions, generating the predictive rules based upon context data and a set of one or more of the business process entities that are invocable at the logical partition.

4. The method of claim 3, wherein the invocable business process entities are selected from services or resources, or both.

5. The method of claim 1, wherein the executing comprises selecting ones of the business process entities to be invoked at respective ones of the partitions of the active instance of the business process based upon the predictive model.

6. The method of claim 5, wherein the business process entities are selected for invocation in accordance with one or more specified quality goals.

7. The method of claim 6, wherein at least one of the one or more quality goals corresponds to one of: maximizing average quality per business process instance; and maintaining business process instance quality above a threshold value.

8. The method of claim 5, wherein the selecting comprises applying the predictive model to context data at a current one of the logical partitions of the active instance of the business process to obtain predictions of business process outcomes for each business process entity invocable at the current business process partition.

9. The method of claim 5, wherein the invocable business process entities are selected from services or resources, or both.

10. The method of claim 1, further comprising:

on a display, presenting a user interface prompting a user to define the quality taxonomy classifying outcomes of instances of the automated business process, wherein the presenting comprises presenting the user interface to prompt the user to define the quality taxonomy in terms of a set of quality categories each of which is associated with (i) a respective condition on process execution data derived from audit logs generated during execution of instances of the business process, and (ii) a respective quantitative quality score value.

11. The method of claim 10, further comprising operating the computer processor to perform operations comprising prompting a user to define one or more quality goals in accordance with which business process entities are to be selected for invocation at stages of an active instance of the business process.

12. The method of claim 11, wherein at least one of the quality goals corresponds to one of: maximizing average quality per business process instance; and maintaining business process instance quality above a threshold value.

13. The method of claim 1, wherein the accessing comprising accessing the process execution data from a business process data warehouse.

14. The method of claim 1, wherein the executing comprises ascertaining the logical stage of an active instance of the business process from context data associated with the active instance, and determining a set of ratings for ones of the resources that are invocable at the ascertained logical stage based on the predictive model.

15. The method of claim 1, wherein the executing comprises, applying the predictive model to the active instance of the business process, ranking ones of the resources invocable at a given one of the stages of the active instance based on the respective probabilities assigned to the quality categories and the respective quality score values associated with the quality categories, and outputting the ranking.

16. The method of claim 1, wherein the executing comprises, selecting the resource to invoke at the given stage of the active instance of the business process based on application of a specified quality goal to the rankings.

17. A computer-readable medium having computer-readable program code embodied therein, the computer-readable program code adapted to be executed by a computer to implement a method comprising:

accessing process execution data derived from audit logs generated during execution of instances of an automated business process comprising business process entities and defined by a directed graph of interconnected nodes representing respective activities, wherein the business process entities comprise services and resources, and each of the activities is defined by a respective service and is performed by a respective set of one or more resources;

classifying the instances of the business process in accordance with a quality taxonomy defined by a set of quality categories each of which is associated with a respective condition on the process execution data and a respective quality score value, wherein the classifying comprises assigning the business process instances to respective ones of the quality categories based on application of the respective conditions to the accessed process execution data;

building a predictive model comprising a respective set of predictive rules for each of multiple logical partitions of the directed graph defining the business process based upon the assignment of the business process instances to respective ones of the categories, wherein each of the predictive rules assigns a respective probability to each of the quality categories of the quality taxonomy for each of the business process entities that are invocable at the respective logical partitions of the directed graph, and each of the probabilities represents a likelihood that a given business process instance that invokes the respective business process entity at the respective logical partition of the directed graph will have an outcome corresponding to the respective quality category; and executing an active instance of the business process based on the predictive model.

18. The computer-readable medium of claim 17, wherein the computer readable program code is adapted to be executed by the computer
to perform operations comprising:
on a display, presenting a user interface prompting a user to define the quality taxonomy classifying outcomes of instances of the automated business process;
wherein in the presenting the computer process performs operations comprising presenting the user interface to prompt the user to define the quality taxonomy in terms of a set of quality categories each of which is associated with (i) a respective condition on process execution data derived from audit logs generated during execution of instances of the business process, and (ii) a respective quantitative quality score value.

19. Apparatus, comprising:
a memory storing program code; and
a computer processor coupled to the memory, operable to execute the program code, and based at least in part on the execution of the program code operable to perform operations comprising
accessing process execution data derived from audit logs generated during execution of instances of an automated business process comprising business process entities and defined by a directed graph of interconnected nodes representing respective activities, wherein the business process entities comprise services and resources, and each of the activities is defined by a respective service and is performed by a respective set of one or more resources;

classifying the instances of the business process in accordance with a quality taxonomy defined by a set of quality categories each of which is associated with a respective condition on the process execution data and a respective quality score value, wherein the classifying comprises assigning the business process instances to respective ones of the quality categories based on application of the respective conditions to the accessed process execution data;

building a predictive model comprising a respective set of predictive rules for each of multiple logical partitions of the directed graph defining the business process based upon the assignment of the business process instances to respective ones of the categories, wherein each of the predictive rules assigns a respective probability to each of the quality categories of the quality taxonomy for each of the business process entities that are invocable at the respective logical partitions of the directed graph, and each of the probabilities represents a likelihood that a given business process instance that invokes the respective business process entity at the respective logical partition of the directed graph will have an outcome corresponding to the respective quality category; and executing an active instance of the business process based on the predictive model.

20. A method, comprising operating a computer processor to perform operations comprising:
receiving context data associated with an active instance of an automated business process defined by a directed graph of interconnected nodes representing respective activities each defined by a respective service and performed by a respective set of one or more resources;
ascertaining a current logical stage of the active instance of the business process based on the received context data;
determining a set of ratings for ones of the resources that are invocable at the current logical stage based on a predictive model comprising a respective set of predictive rules for each of multiple logical partitions of the directed graph defining the business process, each of the predictive rules assigns a respective probability to each of multiple quality categories of a quality taxonomy for each of the resources that are invocable at the respective logical partitions of the directed graph, each of the quality categories is associated with a respective condition on process execution data derived from audit logs generated during execution of instances of the business process, each of the quality categories is associated with a respective quality score value, and each of the probabilities represents a likelihood that a given business process instance that invokes the respective resource at the respective logical partition of the directed graph will have an outcome corresponding to the respective quality category; and
selecting at least one of the resources to invoke in the active business process instance based upon the determined set of ratings.

21. The method of claim 20, wherein process entities are selected for invocation in accordance with one or more specified quality goals.

22. The method of claim 21, wherein a quality goal corresponds to one of: maximizing average quality per business process instance; and maintaining business process instance quality above a threshold value.

23. The method of claim 20, wherein the determining comprises applying the predictive model to context data to obtain the ratings representing predictions of business process outcomes for each business process entity invocable at the current logical stage of the active instance of the business process.

24. The method of claim 20, wherein the invocable business process entities are selected from services or resources, or both.

25. A computer-readable medium having computer-readable program code embodied therein, the computer-readable program code adapted to be executed by a computer to implement a method comprising:
- receiving context data associated with an active instance of an automated business process defined by a directed graph of interconnected nodes representing respective activities each defined by a respective service and performed by a respective set of one or more resources;
- ascertaining a current logical stage of the active instance of the business process based on the received context data;
- determining a set of ratings for ones of the resources that are invocable at the current logical stage based on a predictive model comprising a respective set of predictive rules for each of multiple logical partitions of the directed graph defining the business process, each of the predictive rules assigns a respective probability to each of multiple quality categories of a quality taxonomy for each of the resources that are invocable at the respective logical partitions of the directed graph, each of the quality categories is associated with a respective condition on process execution data derived from audit logs generated during execution of instances of the business process, each of the quality categories is associated with a respective quality score value, and each of the probabilities represents a likelihood that a given business process instance that invokes the respective resource at the respective logical partition of the directed graph will have an outcome corresponding to the respective quality category; and
- selecting at least one of the resources to invoke in the active business process instance based upon the determined set of ratings.

26. Apparatus, comprising:
- a memory storing program code; and
- a computer processor coupled to the memory, operable to execute the program code, and based at least in part on the execution of the program code operable to perform operations comprising
    - receiving context data associated with an active instance of an automated business process defined by a directed graph of interconnected nodes representing respective activities each defined by a respective service and performed by a respective set of one or more resources;
    - ascertaining a current logical stage of the active instance of the business process based on the received context data;
    - determining a set of ratings for ones of the resources that are invocable at the current logical stage based on a predictive model comprising a respective set of predictive rules for each of multiple logical partitions of the directed graph defining the business process, each of the predictive rules assigns a respective probability to each of multiple quality categories of a quality taxonomy for each of the resources that are invocable at the respective logical partitions of the directed graph, each of the quality categories is associated with a respective condition on process execution data derived from audit logs generated during execution of instances of the business process, each of the quality categories is associated with a respective quality score value, and each of the probabilities represents a likelihood that a given business process instance that invokes the respective resource at the respective logical partition of the directed graph will have an outcome corresponding to the respective quality category; and
    - selecting at least one of the resources to invoke in the active business process instance based upon the determined set of ratings.

* * * * *